US006339639B1

(12) United States Patent
Henderson

(10) Patent No.: US 6,339,639 B1
(45) Date of Patent: Jan. 15, 2002

(54) ENHANCED CALL-WAITING WITH CALLER IDENTIFICATION METHOD AND APPARATUS

(76) Inventor: Daniel A. Henderson, 11671 Putter Way, Los Altos, CA (US) 94024

( * ) Notice: Subject to any disclaimer, the term of this patent is extended or adjusted under 35 U.S.C. 154(b) by 0 days.

(21) Appl. No.: 08/963,689

(22) Filed: Nov. 4, 1997

Related U.S. Application Data

(63) Continuation of application No. 08/832,945, filed on Apr. 4, 1997, now abandoned.

(51) Int. Cl.[7] ............................. H04M 1/56; H04M 3/42
(52) U.S. Cl. ............................. 379/142.08; 379/215.01
(58) Field of Search ................................. 379/142, 215, 379/376, 162, 179, 164, 245, 246, 252, 373, 377, 142.08, 215.01; 455/415

(56) References Cited

U.S. PATENT DOCUMENTS

| 3,133,955 A | 5/1964 | Zarouni ........................ 179/84 |
| 3,584,156 A | 6/1971 | Beth ....................... 179/18 BG |

(List continued on next page.)

OTHER PUBLICATIONS

"Caller Identification with Call Waiting: Request for Information from Customer Premises Equipment Suppliers" RFI 91–03, Bellcore, Apr. 1991.
"LSSGR: Voiceband Data Transmission Interface Section 6.6," Technical Reference GR–30–CORE, Issue 4, Dec. 1992.
"Class (SM) Feature: Calling Number Delivery FSD 01–02–1051," Technical Reference TR–NWT–000031, Issue 4, Dec. 1992.

"Calling Waiting FSD 01–02–1201," Technical Reference TR–TSY–000571, Issue 1, Oct. 1989 and Revision 1, Jun. 1991.
"LSSGR LATA Switching Systems Generic Requirements, Class (SM) Feature: Calling Identity Delivery on Call Waiting," Technical Reference TR–NWT–000575, Issue 1, Oct. 1992 and Revision 1, Dec. 1994.
"LSSGR LATA Switching Systems Generic Requirements Class (SM) Feature: Calling Name Delivery Generic Requirements," Technical Reference TR–NWT–001188, Issue 1, Dec. 1991 and Revisions Apr. 1992 and 1995.

Primary Examiner—Curtis A. Kuntz
Assistant Examiner—Rexford N Barnie
(74) Attorney, Agent, or Firm—Melvin A. Hunn

(57) ABSTRACT

An enhanced telephony call waiting feature and apparatus is provided wherein identifying information related to a third party wishing to converse with a first party already communicating with a second party is provided to the first party during a mute condition in a manner that minimizes the time period of the mute condition. The method is fully compatible with existing services while allowing for new services. The method comprises the steps of the local switching office sending a call waiting tone having predetermined characteristics to the first party and its apparatus responding thereto by generating an acknowledgment signal. The apparatus then initiates a mute condition simultaneous with the ACK signal generation, or in response to detection of a carrier signal, or at some other time after exchange of the call waiting tone and/or the acknowledgment signal has occurred. Various methods are disclosed which initiate and terminate the mute condition in the apparatus of the first and second party to allow for the receipt, storage, and display of caller identifying data while minimizing the period of time the first and second party are muted from communicating. The first party may either accept or reject the waiting call in the conventional manner as based on the third party identifying information. Additional features such as voice announcement of the identifying data and comparison with pre-stored data records is also discussed.

78 Claims, 6 Drawing Sheets

U.S. PATENT DOCUMENTS

| | | | |
|---|---|---|---|
| 3,963,874 A | | 6/1976 | Pommerening et al. .. 179/18 AB |
| 4,551,581 A | * | 11/1985 | Doughty ..................... 379/142 |
| 4,661,975 A | | 4/1987 | Brecher ...................... 379/215 |
| 4,873,719 A | | 10/1989 | Reese .......................... 379/215 |
| 4,924,496 A | | 5/1990 | Figa et al. |
| 5,263,084 A | * | 11/1993 | Chaput et al ............... 379/142 |
| 5,289,530 A | | 2/1994 | Reese ............................ 379/88 |
| 5,309,512 A | * | 5/1994 | Blackmon et al. .......... 379/142 |
| 5,550,908 A | * | 8/1996 | Cai et al. ..................... 379/142 |
| 5,583,924 A | * | 12/1996 | Lewis .......................... 379/142 |
| 5,619,561 A | * | 4/1997 | Reese ........................... 379/142 |
| 5,636,269 A | * | 6/1997 | Eisdorfer ..................... 379/142 |
| 5,764,748 A | * | 6/1998 | Rosenthal et al. ........... 379/142 |
| 5,796,810 A | * | 8/1998 | Lim et al. .................... 379/142 |
| 5,812,649 A | * | 9/1998 | Shen ............................ 379/142 |
| 5,825,867 A | * | 10/1998 | Epler et al. .................. 379/142 |
| 5,836,009 A | * | 11/1998 | Diamond et al. ........... 379/142 |
| 5,901,212 A | * | 5/1999 | True et al. ................... 379/142 |
| 5,937,034 A | * | 8/1999 | Kennedy et al. ............ 379/142 |

* cited by examiner

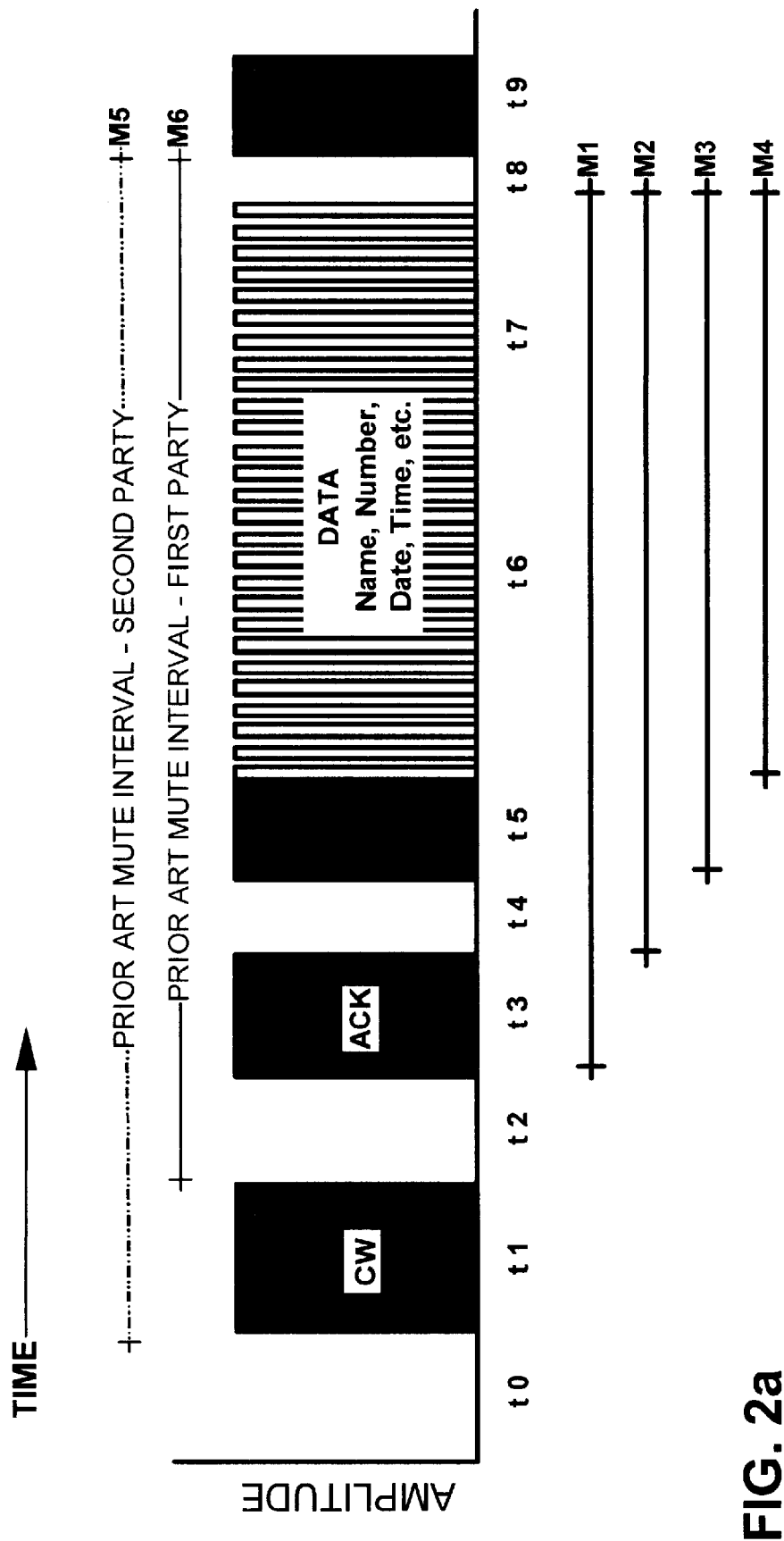

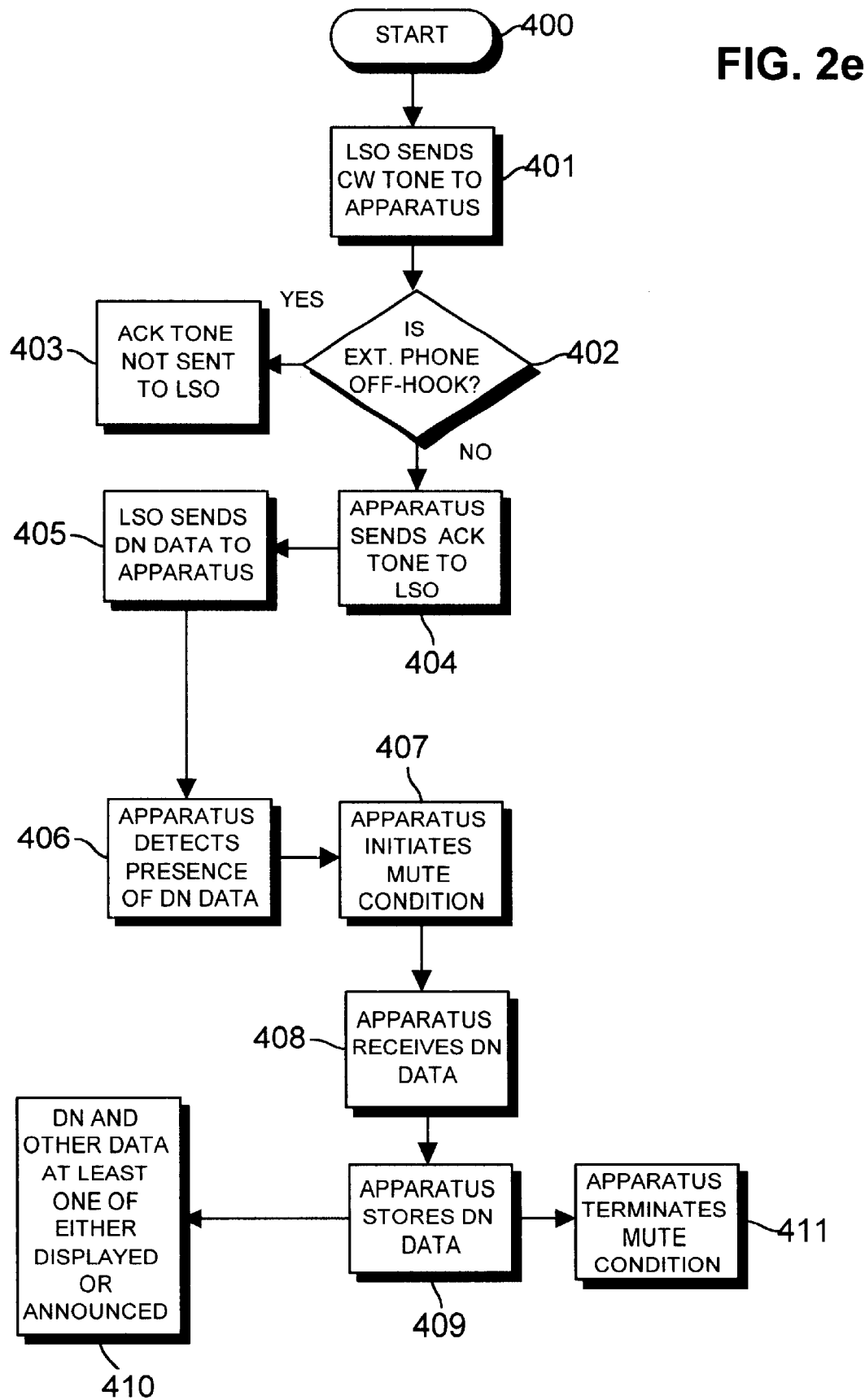

ENHANCED CALL-WAITING WITH CALLER IDENTIFICATION METHOD AND APPARATUS

This is a continuation of Ser. No. 08/832,945, filed Apr. 4, 1997 now abandoned.

BACKGROUND OF THE INVENTION

The invention relates generally to telephone subscriber services and more particularly to improved call-waiting with caller identification services and apparatus.

DESCRIPTION OF THE PRIOR ART

The call-waiting with caller identification telephony feature is becoming more popular as a service offered by many telephone operating companies.

Several early versions of call waiting services are discussed in U.S. Pat. No. 3,133,995 issued to Zarouni, U.S. Pat. No. 3,963,874 issued to Pommerening et al., U.S. Pat. No. 3,997,731 issued to George et al., U.S. Pat. No. 3,584,156 issued to Beth, and U.S. Pat. No. 4,661,975 issued to Brecher. Other systems are described in U.S. Pat. No. 4,873,719 issued to Reese and U.S. Pat. No. 5,583,924 issued to Lewis.

In US Pat. No. 5,263,084 issued to Chaput et al. is shown an improved system and apparatus that mutes the handset in response to receipt of a call-waiting signal to allow receipt of a coded FSK signal that represents the identity of a third communicant while a conversation is taking place between a first and a second communicant. This is a great advantage in that noise signals created by the FSK data transmission will not be heard by the first and second communicants during data transmission but the first communicant can still know the identity of the third communicant by viewing a display.

The disadvantage of the Chaput approach is that the mute condition must occur upon receipt of a call-waiting signal at the CPE, even when no data is yet being transmitted from the local switching office. This is inconvenient and inefficient because the system is muted for an unnecessary interval of time during which communication could occur between the first and second parties.

The present call waiting with caller id systems provide that the second party is placed in a mute condition for a predetermined period of time by the local switching office at the time the call waiting signal is sent to the first party. This occurs so that the second party will not have to listen to the modem transmission of FSK data (that represents the identity of the third party) that is transmitted to the first party apparatus for display. However, this implementation is inconvenient for the second party in that it requires a muted condition not only during the data transmission, but for some predetermined time before and after the data transmission occurs which could be otherwise utilized for conversation between the first and second party.

Even momentary interruptions in a voice conversation have been known to cause miscommunication between communicants, as in the case where telephone number or credit card number data is being exchanged between the first and second communicant. In the case of long distance communication between the first and second party, unnecessary charges are incurred for a telephone call so long as the parties are connected, even if they are not able to speak to each other. Therefore, it is desirable to minimize the amount of time that communication is interrupted by unnecessary muting of the handset.

Although muting can have benefits in preventing communicants from hearing the noise associated with FSK data communication, it may result in wasted time and expense for communicants already engaged in a conversation who are unable to efficiently communicate during the muted period.

What is needed is an improved method and apparatus that minimizes the amount of time that the handset is muted for a first communicant, while allowing data transmission to occur that identifies a third party. Conventional call waiting systems initiate a second party mute condition at the time a call waiting signal is sent. However, dependent upon changes that could easily be implemented at the local switching office affecting the timing of the second party mute condition created by the local switching office, a second party mute condition could also be modified to take advantage of the invention herein so that a first and second communicant would have more time available to continue their conversation and exchange information. Even in the case where no changes were made at the local switching office to reduce the mute period for the second party, the invention described hereinafter is compatible in conventional call waiting systems but could be used in future call waiting systems to minimize the mute condition of the second party as well.

SUMMARY OF THE INVENTION

It is one object of the invention to allow for an improved caller identification with call waiting system and apparatus that is compatible with current caller identification services while providing for future services that could be implemented.

It is another object of this invention to provide an improved method and apparatus of providing identification information related to a calling third party to a first party already engaged in conversation with a second party.

It is another object of this invention to provide to a first party already engaged in a telephone conversation with a second party an improved apparatus which minimizes the amount of time its' associated handset is muted to allow for transmission and receipt of identification information related to a calling third party.

It is another object of the invention to provide to a first party already engaged in a telephone conversation with a second party an improved apparatus which mutes its' associated handset in response to receiving a predetermined time period of mark information in an FSK multiple data message representative of identification information related to a calling third party, and then terminates the mute condition in the handset in response to the absence or end of data transmission from a switching office or upon the expiration of a predetermined time period.

It is still yet another object of the invention to provide to a first party already engaged in a telephone conversation with a second party an improved method and apparatus which mutes its associated handset during or immediately after generating and transmitting an acknowledgement tone to the switching office, and then terminating the mute condition in the handset after a predetermined period of time or in response to receiving an alerting tone or end of message signal from a local switching office.

It is another object of the invention to provide an improved method and apparatus for muting the handset in an apparatus in response to reception of particular data initiated by detection of a start signal word or start bit or pause in an FSK data message from a switching office after a call waiting signal and an acknowledgement signal have been exchanged between the apparatus and the switching office. Further, the mute condition in a handset of the apparatus is terminated in response to a stop bit, stop word, pause, interruption or end of message signal received from the switching office at the apparatus, or alternately, upon the expiration of a predetermined time period after initiation of the mute condition.

It is another object of the invention to provide an improved method and apparatus for muting the handset in an apparatus within a predetermined period of time after an acknowledgement signal has been started or sent from an apparatus to the switching office, and for terminating a mute condition in a handset of the apparatus in response to the elapse of a predetermined period of time after the initiation of the mute condition or alternately, in response to receipt of a stop bit, stop signal word, pause, interruption, or end-of-message signal in the FSK data message.

It is another object of the invention to provide an improved method and apparatus for muting the handset in an apparatus in response to the occurence of a carrier signal detection after a call waiting signal and an acknowledgement signal have been exhanged between the apparatus and the switching office and for the terminating the mute condition in a handset of an apparatus in response to the absence of a carrier detect signal by the apparatus for more than a predetermined period of time.

It is still another object of the invention to provide an improved call-waiting with caller identification method and apparatus that generates an message received signal back to a local switching office which may be used by the local switching office to terminate a second party mute condition, or for other purposes.

It is yet another object of the invention to provide an improved call-waiting with caller identification method and apparatus that compares caller identifying data received against pre-stored data in an apparatus and displays associated data records such as address, city, state or other textual or image information along with, or in place of the caller identification data.

It is a further object of the invention to provide an improved apparatus which is capable of receiving, displaying and storing at a busy telephone station of a first party the caller identifying data of a third party while the first party is engaged in conversation with a second party.

It is yet another object of the invention to store caller identifying data received after a call waiting tone in a memory of an apparatus and to then announce the data received in human audible form.

These and other objects and advantages will become apparent upon review of the detailed specification hereinafter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of several illustrative embodiments when read in conjunction with the accompanying drawings, wherein:

FIG. 2a is timing diagram illustrating signal timing of some of the embodiments shown in FIGS. 2b–2e;

FIG. 2e is a flow chart describing another embodiment of the invention discussing the conversion of DN data received in a call waiting condition into audible speech signals;

DETAILED DESCRIPTION OF THE INVENTION

Figure 1:
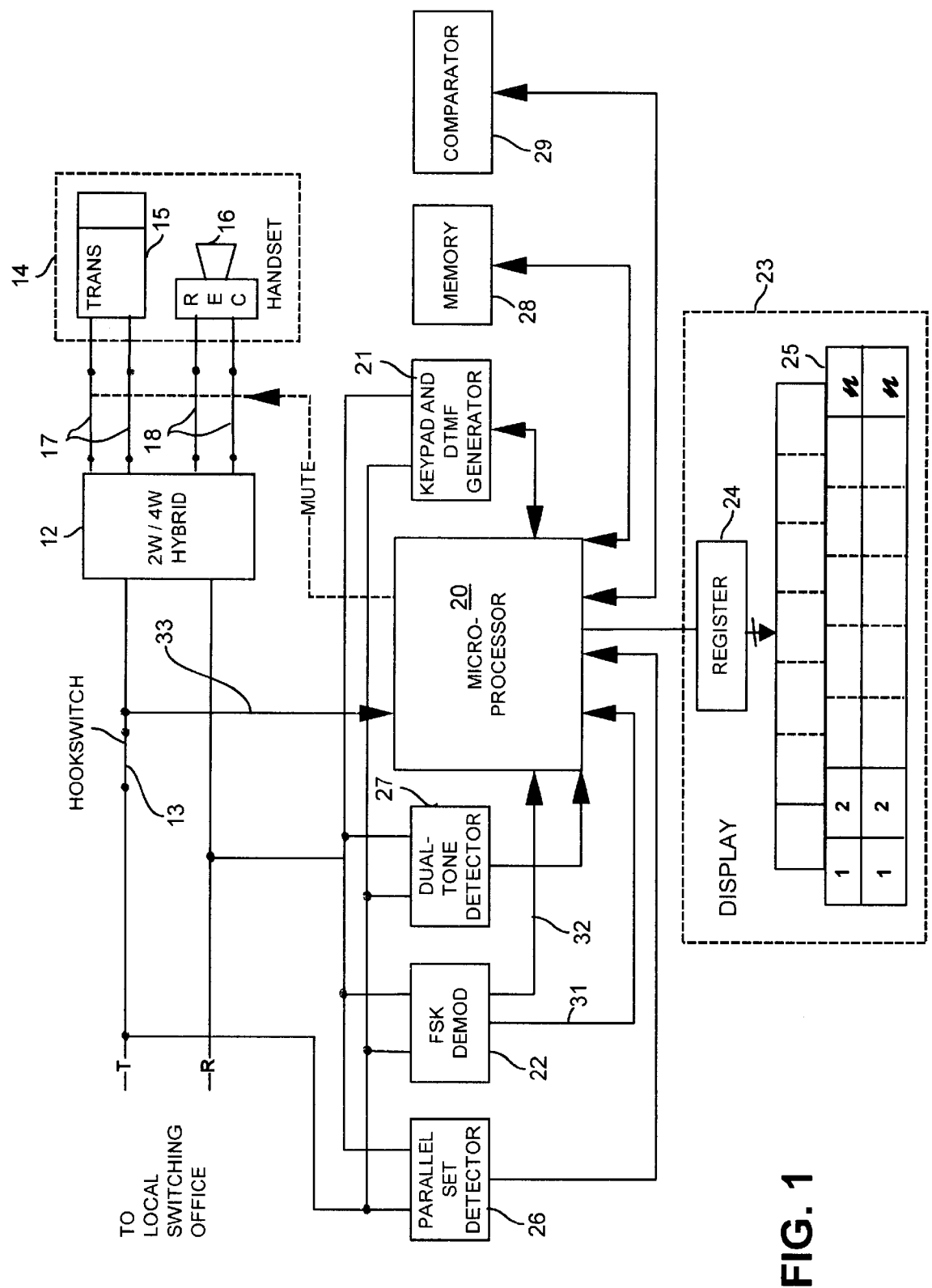
FIG. 1 is a block schematic diagram of a telephone subscriber set in accordance with the invention.

FIG. 1 is a block diagram of at least a portion of an apparatus (CPE) necessary to implement the invention. It is recognized that the CPE adapted to implement the inventions herein could comprise a conventional telephone set with integral circuitry, an adjunct call waiting with caller identification display device, a personal computer with a modem, or other devices. It is further recognized that some elements shown in the block diagram are not required for some embodiments of the invention whereas those elements would be included in other embodiments of the invention described in this specification. Set forth below is a description of what is currently believed to be the preferred embodiment or best example of the invention claimed. Future and present alternatives and modifications which make insubstantial changes in function, in purpose, in structure or in result are intended to be covered by the claims of this patent. Where alterative meanings are possible, the broadest meaning is intended. All words used in the claims are intended to be used in the normal, customary usage of grammar and the English language.

Incorporated herein by reference is the signaling method, format and definition of the messages and parameters as may be utilized in the invention, entitled Calling Identity Delivery On Call-Waiting, TR-NWT-000575; Caller Identification With Call Waiting: Request For Information From Customer Premises Equipment Suppliers, RFI 91-03; SPCS Customer Premises Equipment Data Interface, TR-TSY-000030, Bellcore, Issue 1, November 1988; Call Waiting, LSSGR, Feature Specific Document (FSD) 01-02-1201, TR-TSY-000522, Issue 2, July 1987, CLASS Calling Name Delivery and Related Features Generic Requirements, TA-NWT-001188, Issue 1, Bellcore, March 1991; and CLASS Feature: Calling Number Delivery, TR-TSY-000031, Bellcore, Issue 3, January 1990; and, Caller Identification With Call Waiting: Request For Information From Customer Premises Equipment Suppliers, RFI 91-03, dated April, 1991.

In FIG. 1 is shown a block schematic diagram of at least a portion of a telephone subscriber set (CPE) necessary to implement the invention. A CPE is coupled to a telephone local switching office (LSO) via a standard telephone connector such as the RJ-11-4 type connector, using pins 3 and 4 coupled to the ring and tip lines of the local switching office (not shown). A line protection circuit (not shown) comprising a varistor and fuse is used to protect against over voltage and over current conditions on the ring and tip lines as is well known in the art. A ring detect circuit (also not shown) may provide alerting signals to a first party that a call has arrived, also well known in the art. The telephone line and line protection circuitry is connected to a 2 wire/4 hybrid circuit 12 along with a hookswitch 13. The hybrid circuit 12 is also connected to a handset 14 comprising transmit and receive transducers 15 and 16 respectively. Hybrid circuit 12 is connected to the transducers 15 and 16 via respective switches 17 and 18 as will be described below.

The CPE also comprises a control circuit which may be a commercially available microprocessor or controller, a conventional keypad and DTMF (Dual-Tone Multi-frequency) generator 21, and an FSK (Frequency Shift Keying) demodulator circuit 22 that allows for data demodulation and for carrier detection to occur. The microprocessor 20 is also connected to a commercially available display 23 which includes a register 24 and visual display unit 25 that may comprise one or more rows each having a plurality of cells 1 to n. Although not shown, display 23 may further comprise a touch screen that allows for user input of dialing instructions, scrolling of received and stored caller identifying data, flash, and other functions that are associated with a conventional keypad.

The microprocessor 20 and the tip and ring leads are also connected to a parallel set detector circuit 26 and a dual tone detector circuit 27. The parallel set detector circuit 26 functions to provide an output signal that indicates whether or not the CPE of FIG. 1 is connected with an off-hook extension set. The dual tone detector circuit 27 detects the presence of a dual-tone signal such as a DTMF signal, or may be capable of detecting other non DTMF signals when appropriate or necessary.

A ring detect circuit monitors the ring and tip lines and outputs a signal to microprocessor 20 when a ring signal is detected on the telephone line. The ring detect circuit is a conventional ring detector circuit that generates a ring signal via an optical isolator, which provides insulation between the CPE and the telephone line.

The microprocessor 20 responds to signals from the ring detect circuit, the circuits 22,26,27, off-hook switch detector 33, hookswitch 13, the keypad 21, and others to provide control signals to the muting switches 17 and 18, the DTMF generator 21 and the display 23.

The FSK demodulator 22 may include means for carrier detection as shown in data path 31 to microprocessor 20 that is capable of determining when an incoming data signal is present before actual receipt of the data portion corresponding to the DN of a third party. The FSK demodulator 22 also decodes FSK signals from the LSO and transfers data received via data path 32 to microprocessor 20, comprised of information such as the name, telephone number, date and time, and other information of the third party for storage, display, redial, annunciation or comparison.

Keypad and DTMF generator 21 allows for control of the display of stored caller identification or other information, dial or redial instructions, ACK tone generation, selection of operating modes, and other functions.

Dual-tone detector allows for detection of traditional call waiting signals from the LSO, and is capable of detecting both single and dual-tones as well as other out-of-band signaling that may have a predetermined duration and protocol as employed by the particular call waiting system.

The microprocessor 20 in the CPE is aware of the off-hook status of the handset of the CPE as well as the off-hook status of any extension CPE's connected to the telephone line utilizing parallel set detector 26 and/or input from the off-hook switch detector 33 on the device side of hook switch 13.

Reference is now made to FIG. 2a for a description of the timing diagram which depicts various methods for muting of the handset according to the invention herein which will stand in contrast to the prior art.

Shown is a timing diagram which starts from left to right, with various time intervals identified as t 0 through t 9 which will now be described.

The discussion will first address the typical prior art timing as depicted in M5 and M6. The time interval t 0 is the time during which a third party call is received at the LSO and also is the time before a call waiting signal is delivered to an in-use line between a first and a second party. It is during this interval that, upon receiving a call request from a third party to a first party, the call processor of the LSO executes a call processing software program associated with a call waiting feature and transmits a predetermined dual-tone signal (call waiting tone) to the first party apparatus engaged in a conversation with a second party. In the case of the prior art, the dual tone call waiting signal is typically muted from the second party by the LSO prior to transmission of the call waiting tone to the first party as also shown in M5 of FIG. 2a. This LSO controlled mute condition of the second party is initiated to allow for transmission of any caller identifying data of the third party to the first party apparatus without annoying the second party with audible sounds or transferring information from modem transmission, and lasts for a predetermined period of time. The transmission of the call waiting signal occurs as shown in time period t 1 and may last from 100–300 milliseconds in duration and is typically comprised of a dual tone of 2130 Hz and 2750 Hz transmitted on the telephone line to the first party CPE.

In response to receiving a call waiting signal from the LSO, the CPE mutes its' associated handset via a microprocessor for a predetermined period of time after the call waiting signal has been detected by a DTMF detector during t 1 as shown in M6. Then a determination is made as to whether any extension telephone set is off-hook in t 2.

In the prior art systems, after a determination has been made by an off-hook detector that no extension telephone is off-hook in t 2, an acknowledgment signal (ACK) is generated by a DTMF generator in t 3 to inform the LSO that the CPE is ready to receive data after a mute condition for a predetermined period of time has been initiated at the first party CPE by the microprocessor. If an extension telephone is determined to be off hook in t 2, then the prior art systems inhibit generation of an ACK signal back to the LSO, and the data transmission is terminated from the LSO to the CPE. The microprocessor in the first party CPE inhibits any acknowledgement tone generation in t 3 to prevent the local switching office from further transmitting FSK data that could be annoying to other parties on an extension at the first party location that do not have the handset muted on their telephone.

In any case, after the expiration of a predetermined period of time at the LSO, the second party mute condition is terminated as shown in M5. The first party mute condition also must continue for the predetermined period of time at the first party CPE and then is terminated as shown in M6. Then, once both the first and second party predetermined period of time for the mute condition has elapsed, conversation can continue between the first and second party as before the call waiting tone was received. Typically, the expiration of the predetermined period of time for the first party and the second party occurs sometime after the longest time allowed for data transmission shown in t 7 and depicted in M5 and M6.

If no extension telephone is off-hook, then the apparatus sends an acknowledgement tone back to the LSO as shown in t 3 which is typically 50–100 ms in duration. This is sent after a period of time has elapsed in t 2 and is sent during a very quiet period of time since both the first and second party have been muted.

Upon receipt of the acknowledgment tone from the CPE, the LSO sends logical 1 data during t 5 to condition an FSK demodulator to receive the DN (caller identifying data) of the third party to the CPE, as then received in t 6 and t 7.

In t 6 and t 7, the apparatus receives the DN data, which is translated into digital bit stream data and sent to a microprocessor in the CPE, which translates the data into information that can be viewed on a screen. Then the first party can know the identity or other information of the third party and decide whether to take the call. Finally, in t 8, after the expiration of a predetermined period of time at the LSO and at the first party CPE, the mute condition is terminated for the first and second parties and conversation can be resumed.

Discussion will now address various embodiments according to the invention as represented in M1, M2, M3, and M4. Other adaptations according to the invention are not specifically shown for sake of brevity but it should be recognized that they could be implemented in keeping with the spirit of the invention herein.

When characterized as a method, the present invention is directed to muting the handset in a CPE in a manner that minimizes the period of time that a first and a second party cannot communicate. The method comprises a number of steps.

First, in response to a calling signal from a third party as in t 0, a local switching office sends a call waiting signal to a first party CPE as shown in t 1, when the first party is engaged in conversation with a second party. At this point, utilizing a conventional call waiting system, the second party mute condition could be initiated by the LSO as is conventionally done, before the generation of the call waiting tone to the first party, although it is recognized that it could occur at some other time up to the occurrence of data transmission at t 5 to facilitate full use of the invention herein. The inventive methods described herein could be utilized and coexist in a conventional call waiting system transparent to the end user if desirable. Or, the inventive methods described herein could also be utilized in a modified, non-conventional call waiting system that would minimize the total muted time between a first and second party.

In response to receipt of the call waiting tone at the first party CPE, a microprocessor generates an ACK signal back to the switching office as shown in t 3. Various higher or lower signalling frequencies within the voice band may be used instead of DTMF that could be heard briefly by the first party without deleterious affect because of the short duration required to affect signalling. In addition, the ACK signal could be generated immediately upon detection of the call waiting tone to minimize the total time required to establish communication between the LSO and the CPE. Effectively, it is feasible that time period t 2 would not be required in some implementations and that the first party would hear both the call waiting signal and the ACK signal as one signal because of the generation timing.

Upon receipt at the switching office of the acknowledgment signal generated by the CPE, the switching office transmits data back to the called party CPE as in t 5 that is conventionally logical 1 data and additional FSK (Frequency Shift Keyed) data that is representative of the identity of the third party as in t 6 and t 7.

Shown in M1 is a timing diagram according to one embodiment of the invention in which the CPE microprocessor initiates a mute condition of its' handset simultaneous or during the generation of an ACK signal back to the LSO. In this embodiment, the CPE is then ready to receive data when the LSO transmits data in response to receiving the ACK signal, as shown in t 5. In this case, the first party will usually not hear the ACK signal as the handset is muted upon generation of, or immediately after initiation of, the ACK signal by a ACK signal or DTMF signal generator.

The microprocessor in the first party CPE can initiate a predetermined time period to continue the mute condition as measured against the termination of the call waiting signal at the end of t 1, the initiation or termination of the ACK signal (the beginning or end of t 3 respectively), or the receipt of the first bit of data in the DN caller identifying data received as in t 6 or by some other known time reference. Alternatively, the microprocessor in the first party CPE may terminate the muted condition as a result of receiving a stop bit or signal word at the end of t 6 or t 7, and/or after a carrier signal has not been detected for more than a predetermined period of time. This has significant advantages over the prior art in that the mute condition only need occur in the CPE for so long as data transmission is actually occuring, thereby allowing the first party and the second party to resume conversation as soon as possible. In t 9 is shown an optional end of message signal that may be generated by the DTMF generator under control of the microprocessor in the CPE. This end of message signal is generated after the microprocessor has determined that no more data is being receieved in an automatic fashion from the FSK decoder and may be received by the LSO to indicate successful reception of the DN data. Alternatively, the end of message signal can be manually initiated by a key selection by the first party. The LSO can then terminate the second party mute condition immediately upon receipt of the end of message signal rather than wait for a predetermined period of time to occur. As an alternative use of this information, the LSO may transmit back to the third party an acknowledgment signal or message that the called party has received a call waiting notification and wishes to speak with them shortly after terminating the current conversation with the second party. The third party can then know to remain on the line without the first party having to speak to them.

Shown in M2 is a timing diagram according to another embodiment of the invention in which the CPE has initiated a mute condition in response to the microprocessor determining that the ACK signal generation has been completed. In this embodiment, the first party hears the entire ACK signal prior to the initiation of a mute condition. As discussed previously, the second party may or may not be muted at this time, depending upon the particular determination made at the LSO. For example, the LSO may elect to only initiate the mute condition after successfully receiving an ACK signal from the first party CPE. In one embodiment envisioned, the LSO could generate two different and distinctive tones to alert a call waiting condition. The first party CPE could receive a conventional call waiting tone that would cause a suitable ACK signal to be generated. The second party, not yet muted by the LSO, could receive a second different tone from the LSO that would not cause their CPE to initiate an ACK signal but would still alert the second party that a call waiting condition was occuring and that they would be muted by the LSO for a short period of time. This could also occur simultaneously with the initiation of a mute condition.

Time period M3 shows another embodiment according to the invention herein in which the CPE of the first party utilizes a carrier signal detection circuit to detect the presence of data transmission from the LSO during time period t5 and then initiates a mute condition. It is realized that the period of time to detect a carrier signal is approximately 25–50 ms before the mute condition would be initiated for the first party. After the microprocessor has been notified by a suitable carrier signal detector, such as the Motorola Model MC 145447 or other suitable FSK and carrier signal detectors/decoders, that the presence of carrier signal has been detected, a mute condition can be initiated in the first party CPE handset. The mute condition would be initiated with the detection of a carrier signal as in t 5, and then terminated after the expiration of a predetermined period of time.

Time period M4 shows yet another embodiment according to the invention herein. In this embodiment, the mute condition is initiated at the end of the carrier signal immediately preceding the start of the data portion of the FSK transmission from the LSO to the CPE. As previously described, the termination of the mute condition could be dynamically adjusted to the length of the message received, could be responsive to receipt of a particular stop bit or stop signal word, or could be in response to a predetermined time period.

Time period t 6 data transmission is comprised of a ten digit telephone number and typically lasts for approximately less than 1 second in a 1200 baud system with 8 bit encoding although it is recognized that this transmission time could be reduced with higher modem speeds or different data encoding schemes. Time period t 7 allows for other data including name, time and date data and can be variable in length, depending upon the identity of the third party as sent by the LSO. For this reason, it is most efficient for the termination of the mute condition in the first party CPE to occur in response to the end of data transmission rather than according to a static predetermined period of time.

It is recognized that other data transmission protocol could be utilized instead of FSK signalling without departing from the spirit of the invention. Assuming FSK data transmission, an FSK decoder receives the FSK signals and outputs the caller information in digital logic voltage levels to a microprocessor in the CPE. The handset is muted in response to receipt of the FSK data so that the called party will not be annoyed by audible sounds created by the FSK signalling. The muting of the handset is initiated by the microprocessor by employing several different methods as previously described.

Time period t 8 can allow for the circuits at both ends to prepare to resume normal operation and in time period t 9, an optional end of data signal can be generated by a DTMF or other signal generator to notify the LSO that the data was successfully received by the CPE. The LSO may optionally also use this end of data signal received from the CPE to terminate the mute condition of the second party, rather than relying on a static predetermined period of time as is conventionally done.

Figure 2B:
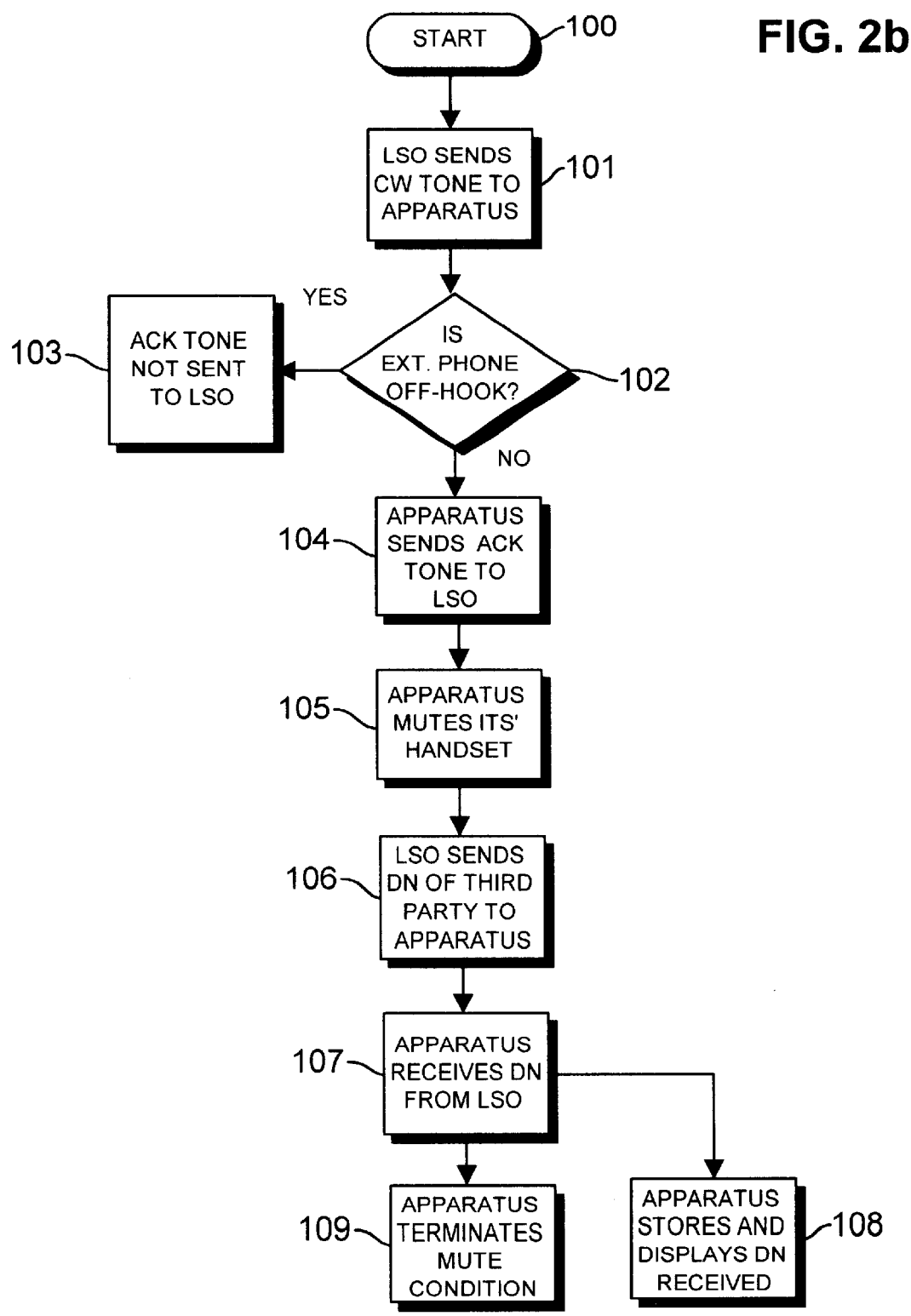
FIG. 2b is a flow chart describing one embodiment of the invention.

The operation of the circuit and invention herein will now be explained using FIG. 2b in conjunction with FIG. 1. It will be assumed that a first party using the CPE shown in FIG. 1 is conversing with a second party via the LSO and that a third party is attempting to reach the first party.

In block 101, the local switching office (LSO) sends a call waiting tone, after receiving a call request from a third party, to a CPE of a first party engaged in conversation with a second party. As described above, this call waiting tone is preferably a dual-tone comprised of a 2130 Hz and a 2750 Hz signal but could be comprised of any other signal that could be reliably detected in the presence of voice and used in a conventional call waiting system.

In block 102, in response to receiving a call-waiting tone by dual tone-detector 27, the CPE checks to see if there is an extension telephone off-hook using parallel set detector 26 or hookswitch detector or connection 33. If there is an extension telephone off-hook as in block 103, microprocessor 20 prevents the generation of an ACK signal by not using DTMF generator 21. As a result of not receiving the ACK signal at the LSO, the DN of the third party is not sent to the CPE and the second party mute condition expires at the LSO. Then the first and the second party conversation is enabled as before receipt of the call waiting signal.

If there is no extension telephone in an off-hook condition as detected by parallel set detector 26 or hookswitch detector 33, then the CPE sends an acknowledgement tone (typically DTMF) back to the LSO as in block 104 using microprocessor 20 and DTMF generator 21 to notify the LSO that the CPE is ready to receive.

After the transmission of the ACK signal by DTMF generator 21, the microprocessor 20 also readies FSK demodulator 22 to receive data and waits for receipt of a carrier detect signal as indicated in connection 31 between FSK Demodulator 22 and microprocessor 20. After detection by a carrier detection circuit of a long enough mark or space in the data transmission, the microprocessor 20 can then proceed to block 105. It should be recognized that data path 31 is shown between FSK Demodulator 22 and microprocessor 20 to logically distinguish the detection of a carrier signal from the actual caller identifying data presented on data path 32. The carrier detection could be performed by the FSK Demodulator 22 and transmitted to the microprocessor 20 via a separate data path 31, or could be performed using the FSK Demodulator 33 and transmitted to the microprocessor 20 via the same data path 32 as utilized for the transmission of other caller identifying data. It is further anticipated that FSK Demodulator or microprocessor could employ a comparing means such as seen in comparator 29 or via an integral comparing means (not shown) to compare a prestored start signal word with the initial data received from the LSO. Unique data such as logical 1 or logical 0 that was received in the preamble of the FSK data transmission for longer than a predetermined period of time could cause a carrier detect signal to be transmitted via data path 31 to the microprocessor 20. In the case of an occurrence of a coincidence between the header data received from the LSO and the prestored data or parameters or logical mark or space for more than a predetermined period of time, the microprocessor would initiate a mute condition.

In any case, after determining carrier detection or a particular start signal bit or word or other data coincidence detection, in block 105 is shown that the microprocessor 20 then initiates a mute condition by opening relays 17 and 18 connected to transmitter 15 and receiver 16 respectively utilizing the connection labeled "MUTE". This mute condition occurs in response to the detection of a carrier signal or other conditions as described earlier in data path 31 and before the DN data transmission has occured.

After the mute condition has been created by the microprocessor 20 in response to a carrier or start signal detection, the FSK Demodulator 22 then receives additional data from the LSO over the telephone line which contains information corresponding to the DN of the third party. Typically this data is formatted using frequency shift keying although it is recognized that other data transmission protocol could be used without departing from the spirit of the invention. Other data types would require a suitable decoder unit to decode and transmit information to the microprocessor.

As is done conventionally, the FSK data is decoded by FSK Demodulator 22 and converted as a digital bit stream via data path 32 to microprocessor 20 as in block 107. Microprocessor 20 then translates that data into information that is transferred to register 24 and displayed on display 23 as in block 108. The subscriber is then in a position to decide whether or not to accept the waiting call based on the identity of the caller. Acceptance of the waiting call is accomplished in the conventional manner with depression of a flash button on the CPE whereas rejection of the waiting call is accomplished by ignoring it. Then in block 109, the handset 14 in the CPE device is unmuted by microprocessor 20 by restoring switch contacts 17 and 18 to a closed condition and the first party may resume conversation. This may occur in several different ways. In one approach, the microprocessor starts a timer means starting as measured against generation of the acknowledgement signal or receipt of data from the LSO. In another approach, the FSK signal demodulator 22 responds to the absence of carrier signal data for more than a predetermined period of time and then notifies microprocessor 20 that there is no more data being received. In a third approach, the FSK Demodulator 22 receives a specific logical data mark or pause or stop bit which is demodulated and transmitted to the microprocessor.

In any case above, after the occurrence of the expiration of predetermined period of time from a known event, lack of detection of carrier signal from the LSO and telephone line for more than a predetermined period of time by the FSK Demodulator 22 and microprocessor 20, or receipt of a specific stop bit or word or pause, the handset 14 in the CPE is restored to an unmuted condition and conversation can occur between the first and second parties in a more efficient manner.

This acknowledgment signal may or may not be heard by the first party, depending upon when the CPE initiates a mute condition. The DTMF acknowledgement tone will comport with the frequency and duration required by the specific call waiting system and may immediately follow the call waiting tone received by the LSO.

In conventional call waiting systems, the second party cannot hear either the call waiting signal or the acknowledgment signal for a predetermined period of time, although the first party may still hear the acknowledgment signal. In modified call waiting systems, conversation may still occur between the first and second parties over this acknowledgment signal when the second party has not yet been muted from the switching office. Furthermore, as mentioned earlier, the second party apparatus may be responsive to the ACK signal and initiate a mute condition.

In block 105 is shown how the CPE mutes its' associated handset in response to the determination that the ACK signal has been sent. In this case, where the first party handset is not yet muted, the call waiting tone will sound like a slightly longer call waiting tone than usual (perhaps no more than 50 ms longer). The call waiting tone received from the LSO is immediately followed by the ACK tone generated by the CPE, both which are heard by the first party in this case.

In an alternative embodiment, the CPE may mute the handset simultaneous with, and caused by, the generation of an ACK tone to be sent to the LSO. This embodiment may be implemented by microprocessor control in the CPE when it is desirable for the first party to not hear the ACK tone transmission. Equipment manufacturers will find this option as an additional feature that may be desirable to make the operation and user interface more consistent with conventional call waiting telephone sets that do not allow the first party to hear the ACK tone. This feature has the added advantage of minimizing the period of time the mute condition occurs in conventional call waiting systems in a manner that is totally transparent to the first and second parties and consistent with the interface of other competing equipment.

In block 104, the CPE generates an ACK tone back to the LSO after a determination is made that no extension telephone is off-hook, and then in block 105 the CPE mutes its' associated handset after the ACK tone has been generated. In this case, the mute condition is caused prior to receipt of the DN data from the LSO.

Alternatively, the handset is muted at the CPE while an ACK tone is generated back to the LSO in block 104 at substantially the same time, and the CPE is made ready to receive DN data from the LSO.

In block 106, the LSO sends the DN (caller identification) data of the third party utilizing FSK data as is known in the art. In block 107, the CPE receives the DN data after the mute condition has been initiated, stores and displays the DN data received for the first party, as in block 108, and terminates the mute condition as in block 109.

The mute condition may be terminated in response to receipt by the CPE of an end of data flag contained in the FSK data transmission. Alternatively, the mute condition may elapse after the expiration of a predetermined period of time as measured from when the ACK signal was first sent or when the mute condition was first initiated. In another approach, the mute condition may be terminated by the detection of the absence of a carrier signal from the LSO to the CPE that lasts for more than a predetermined period of time.

After the handset is returned to an unmuted condition of operation in block 109, the first party may resume conversation with the second party after the time period for the second party mute condition has expired at the LSO. Typically the LSO initiates the mute condition for a predetermined period of time when the call waiting signal is sent to the first party, after which the second party is then returned to a non-muted condition.

An additional function not shown may be alternatively implemented in which the CPE can generate an end of data signal for transmission back to the LSO at the end of receipt of the DN data. This data signal generation may be received by the LSO and used to terminate the mute condition of the second party immediately at the end of transmission of the DN data.

This could be a useful feature in that the second party could be more readily returned to communication with the first party, rather than having to wait for a predetermined period of time to elapse as determined by the LSO. This would enable the first and second party to resume communication more readily than is currently permitted. In the case where the DN data was of variable length, the first and second parties would only be interrupted by a mute condition for the amount of time necessary to transmit the DN data in the improvement discussed without having to wait for the expiration of a predetermined, non-variable length of time to elapse at the LSO.

In one approach, the microprocessor in the CPE causes the handset to mute in response to the elapse of a predetermined period of time after the acknowledgement signal is sent by the CPE to the switching office. A time counter means within the microprocessor initiates a mute condition within a predetermined period of time after the generation of an acknowledgement signal, and then terminates the mute condition of the handset after expiration of the predetermined period of time. This time period can be adjustable according to the signalling protocol employed, the speed of data transmission, and the type of data being transmitted from the switching office.

In another approach, the microprocessor in the CPE causes the handset to mute in response to the receipt of a start bit or start message word contained within the FSK data transmission from the switching office. Upon detection of the start bit or start message word, the microprocessor causes a mute condition in the handset of the CPE while FSK data transmission occurs from the switching office. Additionally, the microprocessor may employ a timer means that will continue the mute condition for a predetermined period of time, and then will cause or allow the handset to return to a non-muted condition. Alternatively, the microprocessor can hold the muted condition until such time as a stop bit or stop message word is received in the FSK data transmission.

In another approach, the microprocessor in the CPE can employ a carrier detection circuit which senses the presence of a data transmission signal from the switching office to terminate the mute condition shown in block 109. The carrier detection circuit can be used to initiate a mute condition upon the sensing of the presence of data from the LSO to the CPE, and can then be used to terminate the mute condition for the handset of the CPE after a predetermined period of time beyond which no data transmission has been detected.

After the carrier detection circuit determines that no other data is being transmitted to the CPE from the LSO, the microprocessor returns the handset to a non-muted condition and the first and second party are allowed to resume conversation. Alternatively, a timer means can also be started upon the initiation of the mute condition by the carrier detection circuit which causes the mute condition to be terminated after the elapse of a predetermined period of time.

It is further contemplated that non-audible signaling could be employed by the switching office to initiate the call waiting notification to the CPE. In response to detection by the CPE of the non-audible signal from the switching office, an audible tone could be generated by the CPE that would serve both as an acknowledgment tone back to the switching office, and as the first audible notification to the first and second parties that a third caller was attempting communication. In the mean time, conversation between the first and the second party would be uninterrupted during the time period when a call waiting tone would be ordinarily heard. Alternatively, an out-of-band call-waiting signal from the switching office or an out-of-band acknowledgment signal generated by the CPE could also trigger a display message such as "Incoming Call" or could initiate a flashing light or displayable icon within the CPE. This would be beneficial in that the first party would be alerted to a call-waiting condition without the second party being aware of another party attempting communication.

Figure 2C:
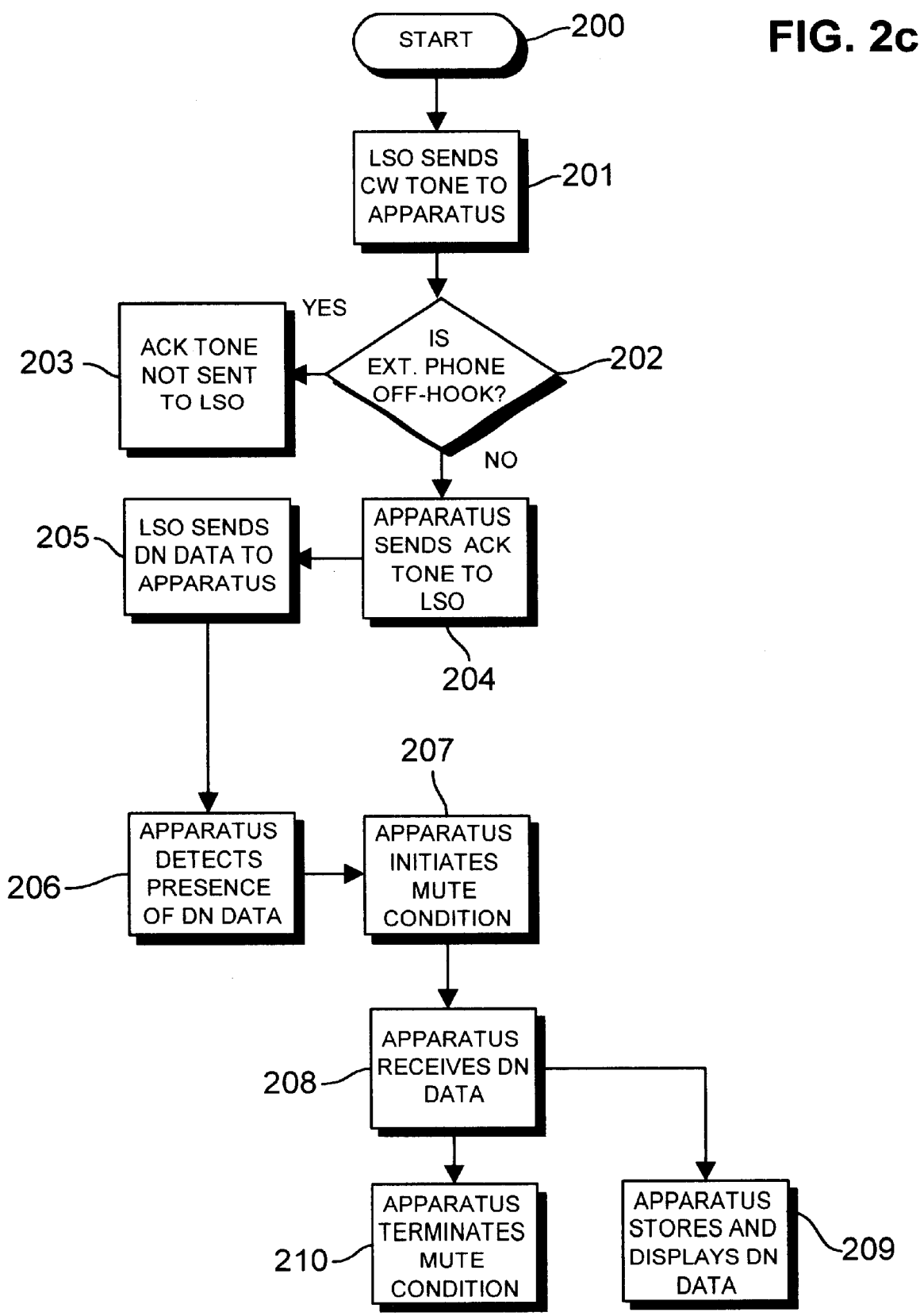
FIG. 2c is yet another flow chart describing a different embodiment of the invention.

Shown in FIG. 2c is another embodiment according to the invention. First, in block 201, the LSO sends a call waiting signal to the first party CPE. Further, the second party speech path is muted from the second party and the first party by the LSO to prevent the second party from hearing any data transmission from the LSO to the first party that may occur. In block 202, a determination is made as to whether or not an extension telephone is off-hook. If an extension telephone is off-hook, then in 203 an ACK signal is not generated, and as a result of not receiving the ACK signal, the LSO prevents the DN information from being transmitted to the first party CPE and the second party mute condition expires or is terminated at the LSO. Then the first and second party may resume conversation as before the call waiting signal.

If an extension telephone is not off-hook as determined in block 202, then in block 204 the CPE sends a suitable ACK tone for receipt at the LSO. In block 205, after receiving the ACK tone from the CPE, the LSO sends FSK data that includes the DN of the third party. In block 206, the CPE employs a carrier detection circuit to sense the presence of data being transmitted from the LSO to the CPE.

In this embodiment, no particular data signal is detected but rather, any carrier data transmission from the LSO as detected by the carrier detection circuit in the CPE will cause a mute condition at the first party CPE to occur before receipt of the remaining data transmission. With the mute condition being established, the CPE is then ready to receive the remaining data, which includes DN data.

In block 208, the CPE receives the DN data, stores and displays the data in block 209, and terminates a mute condition in 210 as previously described.

Alternatively, the method may employ an implementation not shown in which an end of message or message received signal may be generated back to the LSO as also previously described to eliminate an unnecessarily long muted condition for the second party and to alert the third party that the message has been received by the first party. As previously described, this could occur automatically under the control of a microprocessor, or by manual selection by the first party by a key selection at the CPE.

Figure 2D:
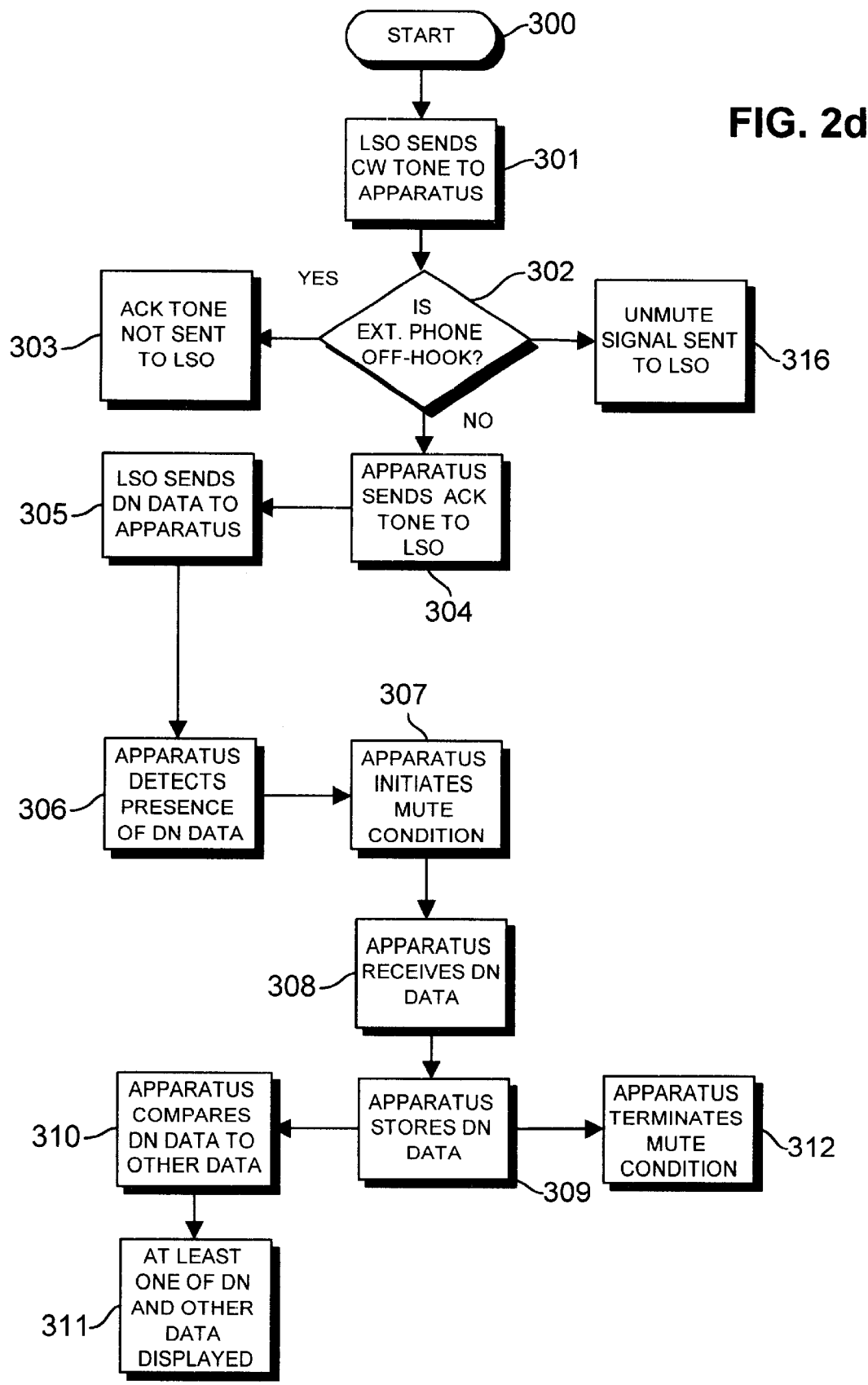
FIG. 2d is a flow chart describing yet another different embodiment of the invention discussing the comparison of DN data received in a call waiting condition against pre-stored data to display at least one of the DN data and the associated data record.

In FIG. 2d is shown another alternative embodiment according to the invention. In block 301, the LSO sends a call waiting tone to the CPE of the first party. Upon receipt of the call waiting tone, the CPE checks to see if an extension telephone is in an off-hook condition, as in block 302. If an off-hook condition is detected, then an acknowledgment tone is not sent by CPE to th e LSO, and the operations previously described in FIG. 2c then occur.

Alternatively is shown in block 316 where in response to detection that an extension telephone is off-hook, a different signal, referred to as an "unmute" signal may be sent to the LSO that will terminate the second party mute condition and will immediately allow the second party to resume conversation with the first party. It is recognized that although this feature may be useful, it is not necessary or fundamental to the invention herein.

In the case where an extension telephone is not off-hook as determined in block 302, the CPE sends an ACK signal to the LSO in block 304. Then in block 305, in response to receiving the ACK signal sent in block 304, the LSO sends an FSK signal containing DN data to the CPE. Then, a carrier detection circuit is employed by the CPE to sense the presence of a data transmission from the LSO in block 306, and the CPE initiates a mute condition in block 307. Then the data transmission continues in block 308 where the CPE receives the DN data of the third party. In block 309, the CPE stores the DN data received.

In an alternative embodiment, the CPE receives data from the LSO in 305, and detects a specific data bit, signal, or word which is contained in the FSK transmission that precedes the DN information, in block 306, and then initiates a mute condition in block 307. Then in block 308 the DN data is received and then stored as in block 309.

In any case after block 307 with the initiation of the mute condition, the CPE either automatically, or in response to a first party selection, compares the DN data received with other data previously stored using a comparator and memory in the CPE as in block 310, and at least one of either the DN data received or the prestored matching data is displayed. The CPE may terminate a mute condition in 312 either before or after the DN data has been applied to a prestored directory and displayed. Reference is made to U.S. Pat. No. 4,924,496 issued to Figa et al. for further discussion related to this feature. It is anticipated that the comparison feature will be widely popular for so called "screen pop" applications for personal computer based telephony in the future.

In FIG. 2e is shown another embodiment in which DN data received may be at least one of displayed and announced to the first party before termination of a mute condition from the second party. Alternatively, data received may be displayed to a first party, and selectively announced to both the first and second party, as determined by the first party preference. In another alternative embodiment, the data received may be anounced to both the first and second party after the termination of the mute condition, which may be of benefit to first parties who wish for the second party to know the identity of the third party to determine if a conference call should be initiated, or for other purposes. This embodiment is uniquely adapted to the needs of visually handicapped persons. The CPE may terminate the mute condition of its' handset at any time after receipt of the DN data in any of the embodiments described herein.

In block 410, after receipt of the DN data, the CPE may employ a text-to-speech processor to textual data received to annunciate the data in a human recognizable form to at least one of the first and second parties, either immediately, or at some later time selected by the first party. Directory numbers and/or names received as logic signals in a microprocessor from an FSK demodulator are processed by a speech generator that which may be integral to the microprocessor, or may be separate discrete circuitry attached to the microprocessor and may be converted into audible speech signals. Further, it is anticipated that this information could be remotely retrieved by a first party that was not present and was calling in for messages.

The data could be applied to a comparator as previously described in block 410 and prestored sound data could be generated, or associated other data could also be applied to a text-to-speech processor. As in FIG. 2d, the CPE could terminate the mute condition in FIG. 2e as shown in block 411 before or after the DN or other data was either one of displayed or announced.

Further adaptations could be implemented according to the invention herein. For example, the various embodiments and apparatus described hereinbefore could inlude a means for determining that after a predetermined period of time that a call waiting signal was received, if no further data was detected from the local switching office by the first party apparatus (CPE), a mute condition would be terminated at the first party apparatus responsive to the expiration of the predetermined period of time. mute condition could be terminated sooner than waiting for the time period that would ordinarily be used for data transmission. This would allow a first party and a second party to communicate more readily than in prior art systems. It may also be beneficial for a call waiting signal to be only sent to a first party if it was determined to be flagged as public by the local switching office. In the case where a DN of a third party was private, depending upon the level of service desired by the first party subscribing to call-waiting service, no call-waiting signal would be sent from the LSO to the first party CPE and a second party mute condition would not be initiated for a second party. In this way, a first party conversing with a second party would only be interrupted by call-waiting signals and mute conditions when there was DN data that would be useful for the first party. In effect, it is anticipated that a new system could be implemented that would effectively "screen" call waiting signals and mute conditions from occuring unless there was DN data present.

It is further anticipated that upon generation of an acknowledgment signal by the first party apparatus or CPE, a timer means could be employed which could start a mute condition in response to expiration of a predetermined period of time after generation of the acknowledgment signal.

Finally it is anticipated that, in the case where the CPE apparatus initiates a message received signal back to the LSO after receiving the caller identifying data of a third party, the LSO could use this information to terminate a mute condition of a second party more readily to allow for the first and second party to communicate sooner.

The foregoing has described the principles and preferred embodiments of the present invention. However, the invention should not be construed as being limited to the particular embodiments described. For example, different devices can be used from the controllers, microprocessors, and tone generators described. Further, some funcitons can be combined in a custom digital signal processing chip. Thus, the above-described embodiments should be regarded as illustrative rather than restrictive. Variations can be made to those embodiments by workers skilled in the art without departing from the scope of the present invention as defined by the following claims:

What is claimed is:

1. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office an acknowledgment signal indicating that it is ready to receive calling party identifying information;

(c) the local switching office then transmitting data corresponding to said identifying information related to the third party;

(d) the first party apparatus responding to the detection of the presence of said data transmission by muting its' own handset;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation.

2. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office a specific acknowledgment signal indicating that it is ready and authorized to receive calling party identifying information;

(c) the first party apparatus then muting its' own handset in response to generation of the acknowledgment signal;

(d) the local switching office then transmitting data corresponding to said identifying information related to the third party in response to receiving said acknowledgment signal from said apparatus;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation.

3. A method as in claim 1 wherein said termination of said muting of said handset occurs before said first party apparatus displays said identifying information.

4. A method as in claim 2 wherein said termination of said muting of said handset occurs before said first party apparatus displays said identifying information.

5. A method as in claim 2 wherein said first party apparatus mutes its' own handset simultaneously and concurrently with said generation of said acknowledgment signal.

6. A method as in claim 1 wherein said first party apparatus initiates a timer for starting a predetermined time period that is related to at least one of the generation of said acknowledgment signal or the occurrence of the mute condition, and said termination of the muting of the handset occurs in response to expiration of said predetermined time period.

7. A method as in claim 2 wherein said first party apparatus initiates a timer for starting a predetermined time period that is related to at least one of the generation of said acknowledgment signal or the occurrence of the mute condition, and said termination of the muting of the handset occurs in response to expiration of said predetermined time period.

8. A method as defined in claim 1 wherein said first party apparatus further responds by terminating said muting of said handset in response to receipt of at least one particular end of data signal present in said data transmitted from said switching office.

9. A method as defined in claim 2 wherein said first party apparatus further responds by terminating said muting of said handset in response to receipt of at least one particular end of data signal present in said data transmitted from said switching office.

10. A method as defined in claim 1 wherein said first party apparatus responds to the presence of data being transmitted from said switching office to said first party apparatus by muting its' own handset utilizing a carrier detection circuit.

11. A method as defined in claim 2 wherein said first party apparatus responds to the presence of data being transmitted from said switching office to said first party apparatus by muting its' own handset utilizing a carrier detection circuit.

12. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office an acknowledgment signal indicating that it is ready to receive calling party identifying information;

(c) the local switching office then transmitting data corresponding to said identifying information related to the third party;

(d) the first party apparatus responding to the detection of the presence of said data transmission by muting its' own handset;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversion;

(g) thus minimizing the period of time for a mute condition of a second party wherein if said local switching office does not receive an acknowledgment signal from said first party apparatus within a predetermined time period after generation of said call waiting tone, said local switching office terminates a mute condition for said second party.

13. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office a specific acknowledgment signal indicating that it is ready and authorized to receive calling party identifying information;

(c) the first party apparatus then muting its' own handset in response to generation of the acknowledgment signal;

(d) the local switching office then transmitting data corresponding to said identifying information related to the third party in response to receiving said acknowledgment signal from said apparatus;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation;

(g) thus minimizing the period of time for a mute condition of a second party wherein if said local switching office does not receive an acknowledgment signal from said first party apparatus within a predetermined time period after generation of said call waiting tone, said local switching office terminates a mute condition for said second party.

14. A method as defined in claim 1 wherein said first party apparatus generates a message received signal back to the local switching office, after it has received said identifying data, so that the local switching office can know that the first party apparatus successfully received all of the data transmitted.

15. A method as defined in claim 2 wherein said first party apparatus generates a message received signal back to the local switching office, after it has received said identifying data, so that the local switching office can know that the first party apparatus successfully received all of the data transmitted.

16. A method as in claim 14 wherein said local switching office can terminate the mute condition of said second party responsive to said message received signal from said first party apparatus so as to minimize the time that a second party is muted.

17. A method as in claim 15 wherein said local switching office can terminate the mute condition of said second party responsive to said message received signal from said first party apparatus so as to minimize the time that a second party is muted.

18. A method as defined in claim 1 wherein said first party apparatus further includes a timer for starting a predetermined period of time that is related to the detection of said data transmitted from said local switching office, and said termination of the muting of the handset of said first party apparatus occurs in response to expiration of said predetermined time period.

19. A method as defined in claim 2 wherein said first party apparatus further includes a timer for starting a predetermined period of time that is related to the detection of said data transmitted from said local switching office, and said termination of the muting of the handset of said first party apparatus occurs in response to expiration of said predetermined time period.

20. The method as in claim 1 wherein said first party apparatus includes:
   (a) a database recorded in memory with a plurality of associated data fields;
   (b) a comparator for comparing said identifying information received with at least one of said plurality of associated data fields; and
   (c) a display member for displaying at least one of (1) said received identifying information, and (2) information obtained from said plurality of data fields.

21. A method for providing to a first party already engaged in a telephone conversation with a second party via a telephone local switching office identifying information related to a calling third party wishing to converse with the first party in a manner that minimizes the time period of a mute condition for a first party, comprising the steps of:
   (a) the local switching office sending a call waiting signal to the first party;
   (b) the first party apparatus responding to the call waiting signal by transmitting to the local switching office a specific acknowledgment signal indicating that it is ready and authorized to receive calling party identifying information;
   (c) the first party apparatus then muting its' own hand set in response to generation of the acknowledgment signal;
   (d) the local switching office then transmitting data corresponding to said identifying information related to the third party in response to receiving said acknowledgment signal from said apparatus;
   (e) the first party apparatus then receiving, storing, and displaying to the first party said identifying information related to the third party as received in said data transmission, thereby allowing the first party to know the identity of the third party; and
   (f) the first party apparatus responding to the detection of the end of said data received by terminating the muting of its' own handset, thereby allowing the first and second party to resume conversation;
   (g) wherein said first party apparatus includes:
      (1) a database recorded in memory with a plurality of associated data fields;
      (2) a comparator for comparing said identifying information received with at least one of said plurality of associated data fields; and
      (3) a display member for displaying at least one of (1) said received identifying information, and (2) information obtained from said plurality of data fields.

22. A method for providing to a first party already engaged in a telephone conversation with a second party via a telephone switching office identifying information related to a calling third party wishing to converse with the first party in a manner that minimizes the time period of a mute condition for a first party, comprising the steps of:
   (a) the local switching office sending a call waiting signal to the first party;
   (b) the first party apparatus responding to the call waiting signal by transmitting to the switching office an acknowledgment signal indicating that it is ready to receive calling party identifying information;
   (c) the switching office then transmitting data corresponding to said identifying information related to the third party;
   (d) the first party apparatus responding to the detection of the presence of said data transmission by muting its' own handset;
   (e) the first party apparatus then receiving and storing said identifying information related to the third party as received in said data transmission;
   (f) the first party apparatus terminating the muting of its' own handset in response to the expiration of a predetermined time period, thereby allowing the first and second party to resume conversation; and
   (g) the first party apparatus converting said stored data into audible speech which can be heard by said first party.

23. A method according to claim 22 wherein said conversion of said stored data into audible speech occurs in response to a manual selection by the first party.

24. A method according to claim 22 wherein said converting said stored data into audible speech is caused to occur automatically for the first party by said first party apparatus.

25. A method according to claim 22 wherein both said first party and said second party may hear said audible speech representative of said stored identifying information.

26. A method for providing to a first party already engaged in a telephone conversation with a second party via a telephone local switching office identifying information related to a calling third party wishing to converse with the first party in a manner that minimizes the time period of a mute condition for a first party, comprising the steps of:
   (a) the local switching office sending a call waiting signal to the first party;
   (b) the first party apparatus responding to the call waiting signal by transmitting to the local switching office an acknowledgment signal indicating that it is ready to receive calling party identifying information;

(c) the local switching office then transmitting data corresponding to said identifying information related to the third party;

(d) the first party apparatus responding to the detection of the presence of said data transmission by muting its' own handset;

(e) the first party apparatus then receiving, storing, and displaying to the first party said identifying information related to the third party as received in said data transmission, thereby allowing the first party to know the identity of the third party;

(f) the first party apparatus responding to the detection of the end of said data received by terminating the muting of its' own handset, thereby allowing the first and second party to resume conversation;

(g) wherein said first party apparatus converts said stored data into audible speech which can be heard by said first party.

27. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office a specific acknowledgment signal indicating that it is ready and authorized to receive calling party identifying information;

(c) the first party apparatus then muting its' own handset in response to generation of the acknowledgment signal;

(d) the local switching office then transmitting data corresponding to said identifying information related to the third party in response to receiving said acknowledgment signal from said apparatus;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation;

(g) wherein said first party apparatus converts said stored data into audible speech which can be heard by said first party.

28. The method as in claim 22 wherein said first party apparatus includes:

(a) a database recorded in memory with a plurality of associated data fields;

(b) a comparator for comparing said identifying information received with at least one of said plurality of associated data fields; and (c) a sound output for announcing audible speech representative of at least one of (1) said received identifying information, and (2) information obtained from said plurality of data fields.

29. The method as in claim 26 wherein said first party apparatus includes:

(a) a database recorded in memory with a plurality of associated data fields;

(b) a comparator for comparing said identifying information received with at least one of said plurality of associated data fields; and (c) a sound output for announcing audible speech representative of at least one of (1) said received identifying information, and (2) information obtained from said plurality of data fields.

30. The method as in claim 27 wherein said first party apparatus includes:

(a) a database recorded in memory with a plurality of associated data fields;

(b) a comparator for comparing said identifying information received with at least one of said plurality of associated data fields; and (c) a sound output for announcing audible speech representative of at least one of (1) said received identifying information, and (2) information obtained from said plurality of data fields.

31. The method as in claim 28 wherein said database recorded in memory with a plurality of associated data fields includes pre-stored sound data.

32. The method as in claim 29 wherein said database recorded in memory with a plurality of associated data fields includes pre-stored sound data.

33. The method as in claim 30 wherein said database recorded in memory with a plurality of associated data fields includes pre-stored sound data.

34. The method as in claim 28 wherein said database recorded in memory with a plurality of associated data fields includes textual data that is converted to audible speech using a text to speech processor contained within said first party apparatus.

35. The method as in claim 29 wherein said database recorded in memory with a plurality of associated data fields includes textual data that is converted to audible speech using a text to speech processor contained within said first party apparatus.

36. The method as in claim 30 wherein said database recorded in memory with a plurality of associated data fields includes textual data that is converted to audible speech using a text to speech processor contained within said first party apparatus.

37. A method as in claim 22 wherein said apparatus initiates a timer for starting a predetermined time period when the generation of said acknowledgment signal occurs, and then initiates a mute condition in said handset in response to expiration of said predetermined time period.

38. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office an acknowledgment signal indicating that it is ready to receive calling party identifying information;

(c) the local switching office then transmitting data corresponding to said identifying information related to the third party;

(d) the first party apparatus responding to the detection of the presence of said data transmission by muting its' own handset;

(e) the first party apparatus then receiving, storing, and displaying to the first party said identifying information related to the third party as received in said data transmission, thereby allowing the first party to ow he identity of the third party; and (f) the first party apparatus responding to the detection of the end of said data received by terminating the muting of its' own handset, thereby allowing the first and second party to resume conversation;

(g) wherein said apparatus initiates a timer for starting a predetermined time period when the generation of said acknowledgment signal occurs, and then a mute condition is initiated in said handset in response to expiration of said predetermined time period.

39. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office a specific acknowledgment signal indicating that it is ready and authorized to receive calling party identifying information;

(c) the first party apparatus then muting its' own handset in response to generation of the acknowledgment signal;

(d) the local switching office then transmitting data corresponding to said identifying information related to the third party in response to receiving said acknowledgment signal from said apparatus;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation;

(g) wherein said apparatus initiates a timer for starting a predetermined time period when the generation of said acknowledgment signal occurs, and then a mute condition is initiated in said handset in response to expiration of said predetermined time period.

40. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office an acknowledgment signal indicating that it is ready to receive calling party identifying information;

(c) the local switching office then transmitting data corresponding to said identifying information related to the third party;

(d) the first party apparatus responding to the detection of the presence of said data transmission by muting its' own handset;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation;

(g) wherein said acknowledgment signal is transmitted only if any extension apparatus associated with the first party apparatus is on-hook.

41. A method for providing to a first party already engaged in a telephone conversation with a second party via a telephone local switching office identifying information related to a calling third party wishing to converse with the first party in a manner that minimizes the time period of a mute condition for a first party, comprising the steps of:

(a) the local switching office sending a call waiting signal to the first party;

(b) the first party apparatus responding to the call waiting signal by transmitting to the local switching office a specific acknowledgment signal indicating that it is ready and authorized to receive calling party identifying information;

(c) the first party apparatus then muting its' own handset in response to generation of the acknowledgment signal;

(d) the local switching office then transmitting data corresponding to said identifying information related to the third party in response to receiving said acknowledgment signal from said apparatus;

(e) the first party apparatus then receiving, storing, and displaying to the first party said identifying information related to the third party as received in said data transmission, thereby allowing the first party to know the identity of the third party; and (f) the first party apparatus responding to the detection of the end of said data received by terminating the muting of its' own handset, thereby allowing the first and second party to resume conversation;

(g) wherein said acknowledgment signal is transmitted only if any extension apparatus associated with the first party apparatus is on-hook.

42. A method as in claim 22 wherein said acknowledgment signal is transmitted only if extension apparatus associated with the first party apparatus is on-hook.

43. A telephone apparatus for receiving third party caller identification information while a first party is in communication with a second party via a local switching office, which is adapted to minimize the time a mute condition must occur, comprising:

(a) a call waiting detector for detecting a call waiting signal in the presence of communication signals on the telephone line between a first and a second party;

(b) control circuit responsive to the detection of said call waiting signal for generating an acknowledgment signal on the telephone line to indicate to the local switching office that said telephone apparatus is authorized and ready to receive data corresponding to said third party caller identification information;

(c) a data detector for detecting the presence of data transmitted from the local switching office, which includes said third party caller identification data, after said call waiting and acknowledgement signals have been exchanged between the local switching office and the telephone apparatus;

(d) a mute initiator for initiating a mute condition of the handset of the telephone apparatus in response to the detection of the presence of data transmitted from the local switching office;

(e) a display member for receiving, displaying and storing identification data related to a third party;

(f) an end detector for detecting the end of said data transmitted from the local switching office;

(g) a termination member for terminating said mute condition in response to the detection of the end of said data transmitted from the local switching office after said identification data has been received.

44. A telephone apparatus as in claim 43 wherein said said display member operates for displaying identification data occurs only after said termination of said mute condition.

45. A telephone apparatus as in claim 43 wherein said mute initiator initiates a mute condition simultaneously and concurrently with said generation of said acknowledgment signal.

46. A telephone apparatus as in claim 43 which further includes a timer for measuring a predetermined period of time that is related to the generation of said acknowledgment signal or initiation of said mute condition, and wherein said termination member operates for terminating said mute condition in response to the expiration of said predetermined period of time.

47. A telephone apparatus as in claim 43 wherein said mute initiator initiates a mute condition after said generation of said acknowledgment signal.

48. A telephone apparatus as in claim 43 including a carrier detection circuit.

49. A telephone apparatus as in claim 43 including an FSK demodulator.

50. A telephone apparatus as in claim 43 that further includes a timer for measuring a predetermined period of time that is related to the receipt of said call waiting signal or generation of said acknowledgment signal, and a member for determining when said identifying data is not received within said predetermined period of time so that said mute condition in the first party apparatus is terminated.

51. A telephone apparatus as in claim 43 wherein said control circuit is comprised of a digital signal processor.

52. A telephone apparatus as in claim 43 wherein said control circuit is comprised of a microprocessor.

53. A telephone apparatus as in claim 43 further comprising a detector for determining if an extension telephone set is in an off-hook condition, and inhibiting or preventing the generation of an acknowledgment signal back to the local switching office.

54. A telephone apparatus as in claim 53 further comprising a generator for generating an un-mute signal back to the local switching office instead of an acknowledgment signal in response to detecting an off-hook condition of an extension telephone set.

55. A telephone apparatus as in claim 43 further comprising a generator for generating an end of message signal back to said local switching office to indicate that a message was received that can be used by the local switching office to terminate a mute condition for a second party.

56. A telephone apparatus as in claim 43 further comprising a text to speech processor for converting said identification data received and stored into audible speech signals.

57. A telephone apparatus as in claim 56 further comprising a a manual initiator for manually initiating said text to speech processor to convert said identification data received into audible speech signals.

58. A telephone apparatus as in claim 56 further comprising an automatic converter for converting said identification data received into audible speech signals before re-establishing communication between said first and second party.

59. A telephone apparatus as in claim 56 further comprising an automatic converter for converting said identification data received into audible speech signals after re-establishing communication between said first and second party.

60. A telephone apparatus as in claim 43 including:

(a) a database recorded in memory with a plurality of associated data fields;

(b) a comparator for comparing said identifying information received with at least one of said plurality of associated data fields; and (c) a display member for displaying at least one of (1) said received identifying information, and (2) information obtained from said plurality of data fields.

61. A method as in claim 40 wherein said termination of said muting of said handset occurs before said first party apparatus displays said identifying information.

62. A method as in claim 40 wherein said first party apparatus initiates a timer for starting a predetermined time period that is related to at least one of the generation of said acknowledgment signal or the occurrence of the mute condition, and said termination of the muting of the handset occurs in response to expiration of said predetermined time period.

63. A method as defined in claim 40 wherein said first party apparatus further responds by terminating said muting of said handset in response to receipt of at least one particular end of data signal present in said data transmitted from said switching office.

64. A method as defined in claim 40 wherein said first party apparatus responds to the presence of data being transmitted from said switching office to said first party apparatus by muting its' own handset utilizing a carrier detection circuit.

65. A method as defined in claim 40 wherein said first party apparatus generates a message received signal back to the local switching office, after it has received said identifying data, so that the local switching office can know that the first party apparatus successfully received all of the data transmitted.

66. A method as in claim 65 wherein said local switching office can terminate the mute condition of said second party responsive to said message received signal from said first party apparatus so as to minimize the time that a second party is muted.

67. A method as defined in claim 40 wherein said first party apparatus further includes a timer for starting a predetermined period of time that is related to the detection of said data transmitted from said local switching office, and said termination of the muting of the handset of said first party apparatus occurs in response to expiration of said predetermined time period.

68. The method as in claim 40 wherein said first party apparatus includes:

(a) a database recorded in memory with a plurality of associated data fields;

(b) a comparator for comparing said identifying information received with at least one of said plurality of associated data fields; and (c) a display member for displaying at least one of (1) said received identifying information, and (2) information obtained from said plurality of data fields.

69. A method as in claim 41 wherein said termination of said muting of said handset occurs before said first party apparatus displays said identifying information.

70. A method as in claim 41 wherein said first party apparatus mutes its' own handset simultaneously and concurrently with said generation of said acknowledgment signal.

71. A method as in claim 41 wherein said first party apparatus initiates a timer for starting a predetermined time period that is related to at least one of the generation of said acknowledgment signal or the occurrence of the mute condition, and said termination of the muting of the handset occurs in response to expiration of said predetermined time period.

72. A method as defined in claim 41 wherein said first party apparatus further responds by terminating said muting of said handset in response to receipt of at least one particular end of data signal present in said data transmitted from said switching office.

73. A method as defined in claim 41 wherein said first party apparatus responds to the presence of data being transmitted from said switching office to said first party apparatus by muting its' own handset utilizing a carrier detection circuit.

74. A method as defined in claim 41 wherein said first party apparatus generates a message received signal back to the local switching office, after it has received said identifying data, so that the local switching office can know that the first party apparatus successfully received all of the data transmitted.

75. A method as in claim 74 wherein said local switching office can terminate the mute condition of said second party responsive to said message received signal from said first party apparatus so as to minimize the time that a second party is muted.

76. A method as defined in claim 41 wherein said first party apparatus further includes a timer for starting a predetermined period of time that is related to the detection of said data transmitted from said local switching office, and said termination of the muting of the handset of said first party apparatus occurs in response to expiration of said predetermined time period.

77. A method as defined in claim 41 wherein said first party apparatus further includes a timer for starting a predetermined period of time that is related to the detection of said data transmitted from said local switching office, and said termination of the muting of the handset of said first party apparatus occurs in response to expiration of said predetermined time period.

78. The method as in claim 41 wherein said first party apparatus includes:

(a) a database recorded in memory with a plurality of associated data fields;

(b) a comparator for comparing said identifying information received with at least one of said plurality of associated data fields; and (c) a display member for displaying at least one of (1) said received identifying information, and (2) information obtained from said plurality of data fields.

* * * * *